UNITED STATES PATENT OFFICE.

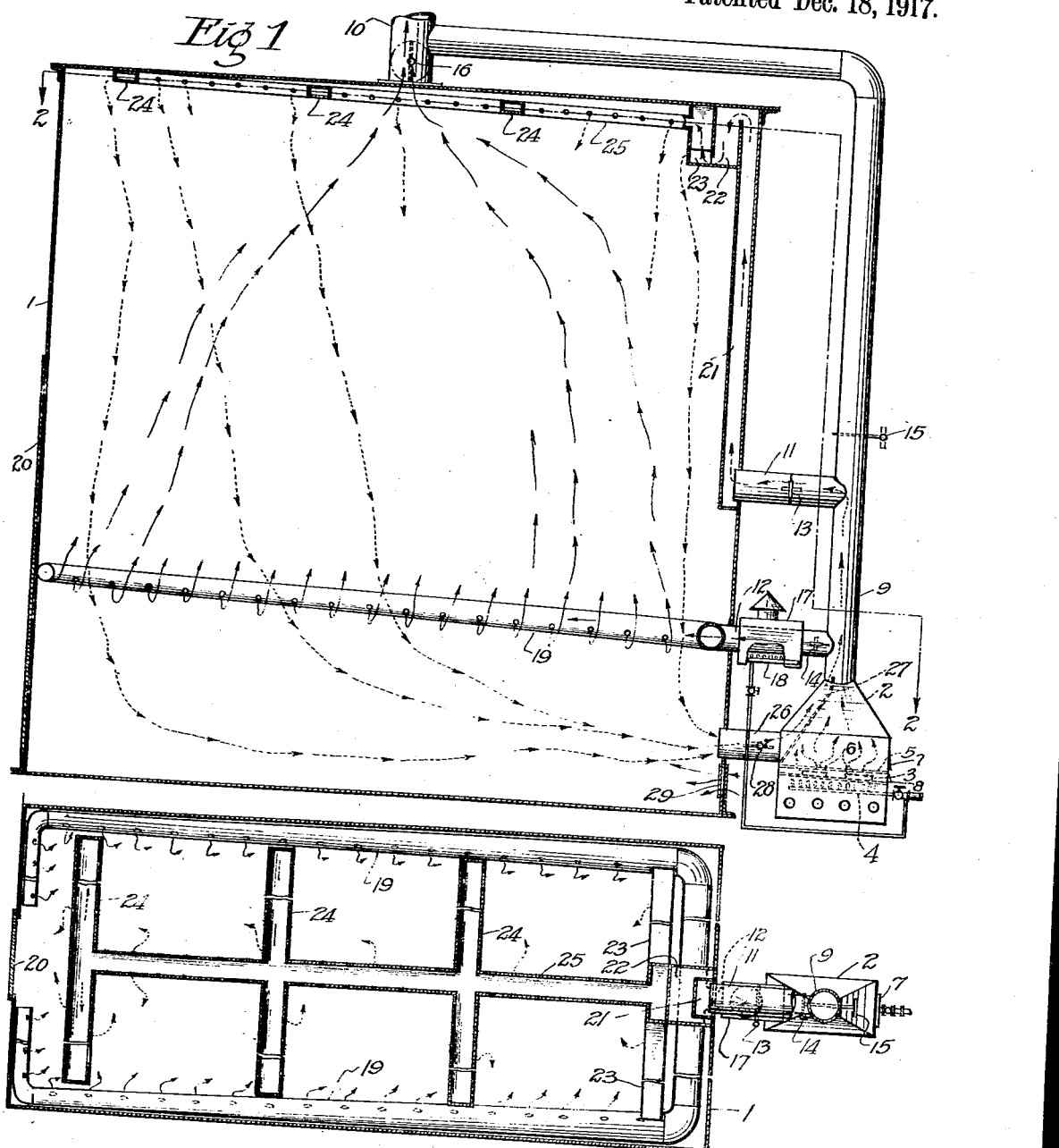

ANDREW C. LEGG, OF BIRMINGHAM, ALABAMA.

DUPLEX PROCESS FOR SMOKE-CURING MEATS.

1,250,934. Specification of Letters Patent. Patented Dec. 18, 1917.

Application filed December 14, 1915. Serial No. 66,765.

*To all whom it may concern:*

Be it known that I, ANDREW C. LEGG, a citizen of the United States of America, residing at Birmingham, in the county of Jefferson and State of Alabama, have invented certain new and useful Improvements in Duplex Processes for Smoke-Curing Meats, of which the following is a specification.

My present invention relates to a process for the curing of meats by means of a preservative smoke or gaseous product generated by heat from wood and preferably free from the presence of any products of active combustion.

The smoke curing of meat blocks, such as hams and bacon which are treated preliminarily in a pickle, resolves itself in two steps, namely: drying out the meat blocks by driving off the moisture, and finishing the curing of the meat by causing a preservative smoke to permeate it and deposit preservative agents thereon. Before the smoke will thoroughly permeate and cure the meat, the moisture therein must be driven out. Another factor that must be considered in any commercially successful process for smoke curing meats is the element of time required for the treatment of the meat blocks in the smokehouse.

The present general practice is to pass a hot smoke containing the products of active combustion through the smokehouse with a direct passage to the stack, such smoke being used both to drive out the moisture from, and then to cure the meats, but, as is well known, such process is attended with two serious objections; the first being that a very substantial and costly shrinkage of fat occurs during the curing process as a result of the presence of relatively high heat during the final stage of the curing; and the second being that the quality and appearance of the meat is injured by the soot, ashes and other impurities from the products of combustion in the preservative smoke which settle on the meat blocks.

In a process described in my pending application Serial No. 13,062, I generate a preservative smoke, free from the products of active combustion, and deliver it at a moderate temperature and with practically no loss of its curative properties by condensation into the smokehouse, where it settles through the meats and is returned through the smoke generator to the smokehouse. I thus obtained a continued circulation of the cool smoke which was automatically maintained by the chilling and settling of the smoke through the curing chamber and the reheating and rising of the smoke through the generator. While this process effected a perfect cure of the meat, giving it exceptionally fine quality and color, it was found subject to the objection that the curing process consumed so long a time that its other economical advantages were to an extent offset thereby. By experiments I discovered that the loss of time arose from the effort to dry out the meat blocks by a cool, slowly circulating body of smoke. Thereupon I conceived the idea of utilizing what I term a duplex process, which, having due consideration for the two steps above referred to in the curing of the meats, contemplates a utilization, during the first step of the curing, of a hot gas or smoke to dry the meat and passing it (preferably without a return circulation as I thereby avoid the use of additional apparatus for condensing and removing the moisture therefrom) through the meats until there is evidence that a shrinkage of fat is about to commence and then, during the second step of the curing, utilizing a cool smoke to complete the curing of the meat. The advantages of this duplex process will be at once apparent to those skilled in the art for the shrinkage in fat does not occur until after the meats have been substantially dried out, and therefore I am enabled to utilize a high temperature and rapid draft in my smokehouse to quickly drive off the surplus moisture from the meat and bring this first step of the process to a conclusion in a few hours time, whereas the utilization of a cool smoke for this purpose would require days. The second phase of the curing process, which relates to the imparting of the flavor and color to the meat blocks is then accomplished with the requisite expedition by the use of a cool preservative agent and with so slight a loss of fat shrinkage that a remarkable economy in the curing of meats results.

Another phase of my invention, as practised in its preferred form, relates to the manner in which the smoke is brought into contact with the meat blocks. The hot smoke is caused to pass upwardly by its natural draft through the smokehouse and thus acts more directly upon the under portions of the meat blocks, whereas the cool smoke, which is lifted by its natural draft into the top of the smoke box will settle down through the meats and act more directly on the upper portions of the meat blocks. By producing the preservative smokes of both temperatures in a generator which will exclude therefrom the products of active combustion, I cure the meat blocks with a fancy color and flavor and I am enabled to bring them out of the smokehouse in a length of time not appreciably longer than that now customary in the curing of meats. I desire it to be understood that other means than the hot smoke may be employed to effect the rapid drying out of the meats.

Having thus generally described my process, I will now set forth a more specific description thereof by reference to the drawings which show a typical apparatus for carrying my process into effect, and in which:—

Figure 1 is a vertical sectional elevation through a smoke box showing the preservative generator in side elevation.

Fig. 2 is a horizontal sectional view on the line 2—2 through the smokehouse.

Similar reference numerals refer to similar parts throughout the drawings.

As illustrated in the drawings, 1 is a smokehouse of any suitable size and constructed of any suitable material. Without the smokehouse is a preservative smoke generator 2 of a type substantially similar to that described in my pending application Serial No. 13,063, and which may be herein briefly described as comprising a casing having a partition 3 which divides the lower from the upper portion, a burner 4 located below the partition, and a smothering plate 5 disposed above the partition. The box is provided with suitable openings for the introduction of the fuel blocks 6 and for a regulated access of air by means of dampers or doors 7 and 8 which are formally illustrated. The preservative smoke is generated in the upper portion of the generator by the charring of the fuel without active combustion and is therefore free from the products of active combustion and not highly heated. The smoke passes by a natural draft up through a pipe 9, and thence either through a stack 10 to the atmosphere, or through one or the other of the branch pipes 11 and 12 into the smokehouse. I provide a damper valve 13 in the pipe 11, a damper valve 14 in the pipe 12, a damper valve 15 in the pipe 9 above its junction with the pipe 11, and I lead the stack 10 into the top of the smokehouse and provide a damper valve 16 therein below the pipe 9. A heater 17 of any suitable type surrounds the pipe 12 and has a gas burner 18 therein to raise the temperature of the smoke to any desired degree of heat when directed through the pipe 12 into the lower portion of the smokehouse. The pipe 12 delivers into a perforated pipe 19 which extends around the lower portion of the smokehouse on each side to its door 20. The pipe 11 opens into a vertical conduit 21 which passes through a baffling chamber 22 from which lead a series of distributing pipes formed by the transverse branches 23, 24 and the longitudinal supply pipe 25 for the branches 24. These pipes 23, 24 and 25 are perforated and adapted to distribute the cool smoke uniformly throughout the smokehouse above the meat blocks. A return flue 26 leads from the lower portion of the smokehouse to the upper portion of the generator, and a baffle 27 is provided in the generator to direct this return smoke upwardly into the pipe 9 where the up draft will act to draw the chilled smoke from the smokehouse under control of a damper valve 28 through pipe 26 and return it to circulation through pipe 9. In addition, the box may be provided, if desired, with one or more damper slides 29 which are arranged to admit fresh air into the lower portion of the smokehouse.

To illustrate the practical operation of my invention in connection with the typical apparatus described, fuel blocks 6 are introduced under the smothering plate 5 and the burner 4 is started below the partition, either or both of doors 7 and 8 being opened just enough to admit sufficient air to permit the wood to smother and char without active combustion. The preservative smoke thus generated flows by its natural draft up the pipe 9. In starting the process, the dampers 11, 15 and 28 are closed and the dampers 14, 16 and 29 are opened, whereupon the preservative smoke flows through the pipe 12 and the distributing pipes 9, being raised to the desired temperature by means of the burner 18. The hot gases thus delivered into the smokehouse flow upwardly and with a comparatively rapid circulation through the meats and pass out through the stack 10, the circulation during this part of the process being indicated by the arrows shown in heavy solid lines. The dry smoke is heated high enough to quickly dry out the meats and its use is continued until a shrinkage of the fat on the meat blocks is imminent, whereupon the dampers 27, 14 and 16 are closed and the dampers 11 and 28 are opened and the burner 18 is cut out of service. The preservative smoke thereupon passes in through the pipes 11 and 21, the distributer 22, and the several pipes 23, 24 and 25 into the upper portion of the smokehouse. This smoke is delivered into the smokehouse as a cool smoke having a temperature of only a few degrees above that in the smokehouse. The smoke is readily obtained at this temperature because its heat of generation is not high and it is slightly cooled in its passage through conduits 9, 11 and 21, but, it is not chilled sufficiently to have condensed the preservative properties in suspense therein to any substantial extent until it arrives within the smokehouse. As this smoke settles downwardly through the meats it becomes chilled and condenses, depositing curative matter in suspense therein upon the dried meat blocks so that both this preservative and the smoke itself penetrates and thoroughly cures the meats. The up draft in the pipe 9 takes effect through pipe 25 to draw out the chilled smoke from below the meats and return it to the circulation, and it will be noted that this circulation is readily controllable by the extent of the draft in the pipe 9 which in turn is controllable by the regulation of the burner 4 and the doors 7, 8. The up and down drafts obtained by my method effect a uniform curing of the meat blocks on all sides.

When it is desired to clear the house of smoke, the dampers 13 and 14 are both closed and the dampers 15, 16 and 29 are opened, and by means of the draft thus induced in the stack 10 and the admission of fresh air, the smoke is rapidly cleared from the smokehouse. Inasmuch as the principal object in the first part of the process is to dry out the meat blocks, a hot dry air may be used for this purpose but as a preservative smoke can be generated by my apparatus at a negligible cost its use is preferable.

Having thus described my invention, what I claim as new and desire to secure by Letters Patent, is:—

1. The hereindescribed process for curing meats, which consists in subjecting the meats to a hot gas to rapidly drive off the moisture from the meat, and then completing the curing of the meats with a cool preservative gas.

2. The hereindescribed process for curing meats, which consists in subjecting the meats to a hot dry smoke until its moisture has been substantially eliminated, and then subjecting the meats to a cool smoke until its cure is completed.

3. The hereindescribed process for curing meats, which consists in subjecting the meats to a rapid up draft of dry hot smoke until the shrinkage of fat begins, and then finishing the curing of the meats with a down draft of cool smoke.

4. The hereindescribed process for curing meats, which consists in passing a body of hot preservative smoke through the meats until the shrinkage of fat begins, and then finishing the curing of the meats by a continuous circulation of smoke at a relatively lower temperature so as to cause but slight shrinkage in fat.

5. The hereindescribed process for curing meats, which consists in passing a hot gas free from the products of active combustion and with rapid circulation through the meats until they commence to show shrinkage in fats, and then finishing the cure of the meats in a cool slowly circulating body of preservative smoke from which the products of active combustion are excluded.

6. The hereindescribed process for curing meats, which consists in first passing through the meats a hot preservative smoke together with an ample supply of fresh air sufficient to rapidly dry out the meats, and continuing such drying process until the shrinkage in fats commences to an appreciable extent, and then treating the meats in a circulating body of relatively cool preservative smoke which is heated slightly, and maintaining the volume of said cool smoke by gradual accretions, said hot and cool smoke being both free of the products of combustion.

7. The hereindescribed process for curing meats, which consists in generating a preservative smoke at a comparatively low temperature and free from the products of active combustion, raising the temperature of said smoke during initial curing process and passing it in direct draft through the meats to rapidly dry them and until shrinkage in fat occurs, then shutting off the hot smoke and delivering the smoke at a relatively cooler temperature above the meats and drawing the chilled smoke from below the meats and returning it in circulation, said cool smoke being adapted to be slightly reheated in each cycle to cause it to condense as it passes through the meats.

In testimony whereof I affix my signature.

ANDREW C. LEGG.

Witness:
NOMIE WELSH.